US011331960B2

(12) United States Patent
Tanno et al.

(10) Patent No.: US 11,331,960 B2
(45) Date of Patent: May 17, 2022

(54) PNEUMATIC TIRE (71) Applicant: The Yokohama Rubber Co., LTD., Tokyo (JP)

(72) Inventors: Atsushi Tanno, Hiratsuka (JP); Hiraku Kouda, Hiratsuka (JP); Jun Matsuda, Hiratsuka (JP); Masaaki Nagayasu, Hiratsuka (JP); Yuki Sasaya, Hiratsuka (JP); Ryohei Takemori, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 24 days.

(21) Appl. No.: 16/770,575

(22) PCT Filed: Dec. 4, 2018

(86) PCT No.: PCT/JP2018/044502
§ 371 (c)(1),
(2) Date: Jun. 5, 2020

(87) PCT Pub. No.: WO2019/111875
PCT Pub. Date: Jun. 13, 2019

(65) Prior Publication Data
US 2020/0376904 A1 Dec. 3, 2020

(30) Foreign Application Priority Data
Dec. 6, 2017 (JP) .............................. JP2017-234521

(51) Int. Cl.
*B60C 15/04* (2006.01)
*B60C 15/06* (2006.01)

(52) U.S. Cl.
CPC .......... *B60C 15/04* (2013.01); *B60C 15/0603* (2013.01); *B60C 2015/046* (2013.01); *B60C 2015/048* (2013.01)

(58) Field of Classification Search
CPC ..... B60C 15/06; B60C 15/04; B60C 15/0603; B60C 2015/0617; B60C 2015/0621; B60C 2015/048; B60C 15/0054
See application file for complete search history.

(56) References Cited

U.S. PATENT DOCUMENTS 4,261,405 A * 4/1981 Yamauchi ................. B60C 9/14
152/454
8,146,633 B2 * 4/2012 Maruyama ............... B60C 3/04
152/450
(Continued)

FOREIGN PATENT DOCUMENTS

JP 11189018 A * 7/1999
JP 2000-351306 12/2000
(Continued)

OTHER PUBLICATIONS

International Search Report for International Application No. PCT/JP2018/044502 dated Mar. 12, 2019, 4 pages, Japan.

*Primary Examiner* — Timothy Kennedy
*Assistant Examiner* — Farah Taufiq
(74) *Attorney, Agent, or Firm* — Thorpe North & Western (57) ABSTRACT

Of layers configuring a bead core of a pneumatic tire, the width W0 of one of the layers including the greatest number of rows, the width W1, W2 of other of the layers located respectively innermost and outermost in the radial direction satisfy W1>W2 and W2≤0.5×W0. The position of width W0 is inward in the radial direction of the center of the bead core. A carcass is folded and curved along the bead core and extends toward sidewalls where a folded back portion of the carcass contacts a body of the carcass. A rubber occupancy ratio in a closed region formed by the body and the folded back portion is 0.1% to 15%. The cross-sectional area S2 and hardness H2 of a filler outward of the carcass in the lateral direction, and the cross-sectional area S1 and the hardness H1 of the side reinforcing layer satisfy 0.12≤(S2×H2)/(S1×H1)≤0.50.

13 Claims, 6 Drawing Sheets

(56) References Cited

U.S. PATENT DOCUMENTS

| | | | |
|---|---|---|---|
| 2003/0106627 A1* | 6/2003 | Tonezzer | B60C 15/04 152/454 |
| 2013/0146201 A1* | 6/2013 | Thomas | B60C 15/04 152/540 |
| 2013/0248072 A1* | 9/2013 | Horiuchi | B60C 17/0027 152/516 |
| 2015/0020944 A1 | 1/2015 | Till et al. | |
| 2015/0075691 A1* | 3/2015 | Merino Lopez | B60C 15/04 152/502 |
| 2015/0083299 A1* | 3/2015 | Yukawa | B60C 15/0027 152/517 |

FOREIGN PATENT DOCUMENTS

| | | | | |
|---|---|---|---|---|
| JP | 2001-510419 | | 7/2001 | |
| JP | 2002-301915 | | 10/2002 | |
| JP | 2002301915 A | * | 10/2002 | D07B 1/062 |
| JP | 2004082767 A | * | 3/2004 | |
| JP | 2008-149778 | | 7/2008 | |
| JP | 2012162204 A | * | 8/2012 | |
| JP | 2015-020741 | | 2/2015 | |
| JP | 2015-067002 | | 4/2015 | |
| WO | WO 98/33670 | | 8/1998 | |

* cited by examiner

PNEUMATIC TIRE

TECHNICAL FIELD

The present technology relates to a pneumatic tire provided with a side reinforcing layer on a sidewall portion, and more particularly, relates to a pneumatic tire that provides an improved structure of a bead portion allowing for reduction in tire weight while maintaining tire durability.

BACKGROUND ART

In general, a bead core and a bead filler are embedded in a bead portion of a pneumatic tire. Additionally, a pneumatic tire (a so-called run-flat tire) that can safely travel a certain distance even when a puncture occurs is structured such that a side reinforcing layer (a layer formed of a hard rubber having a cross sectional shape that is crescent-shaped) is provided on a sidewall portion for supporting a load applied from a vehicle when the tire is punctured. In such a tire, an inner end portion of the side reinforcing layer in the tire radial direction may reach a location near the bead portion. Accordingly, the thickness of the location near the bead portion increases, and thus the tire weight is likely to increase.

On the other hand, in recent years, a reduction in tire weight has been strongly demanded, and weight reduction of the foregoing pneumatic tire has also been considered. For example, in Japan Unexamined Patent Publication No. 2002-301915, a pneumatic tire provided with a side reinforcing layer having a crescent-shape in cross-section is structured such that the shape of a bead core is contrived, and thus a bead filler is eliminated. However, even when such a tire can be reduced in weight, rigidity in a location near a bead portion is low. Accordingly, tire durability cannot be sufficiently obtained. Thus, an additional countermeasure is required.

SUMMARY

The present technology provides a pneumatic tire including a side reinforcing layer on a sidewall portion, providing an improved structure of a bead portion allowing for reduction in tire weight while maintaining tire durability.

A pneumatic tire according to an embodiment of the present technology includes: a tread portion extending in a tire circumferential direction and having an annular shape; a pair of sidewall portions disposed on opposite sides of the tread portion; a pair of bead portions disposed inward of the sidewall portions in a tire radial direction; a bead core provided in each of the bead portions; a carcass layer mounted between the pair of bead portions; and a side reinforcing layer provided inward of the carcass layer in the sidewall portion in a tire lateral direction and having a crescent-shape in cross-section. The bead core includes at least one bead wire wound in the tire circumferential direction. A plurality of circumferential portions of the bead wire form at least one row arranged in the tire lateral direction and a plurality of layers overlapping in the tire radial direction. A width W0 of one of the plurality of layers, which includes a greatest number of rows and a width W1 of another of the plurality of layers, which is located on the innermost side in the tire radial direction, satisfy relationships W1>W2 and W2≤0.5×W0. The layer of the plurality of layers, which includes the greatest number of rows is located inward in the tire radial direction of the center position of the bead core in the tire radial direction. The carcass layer includes a body portion extending from the tread portion through each of the sidewall portions to each of the bead portions, and a folded back portion folded at each of the bead portions and curved along a periphery of the bead core, and extending toward each of the sidewall portions while contacting the body portion from an outer end position of the bead core in the tire radial direction. A ratio of a total area of rubber present in a closed region to an area of the closed region formed by the body portion and the folded back portion of the carcass layer is from 0.1% to 15%. A filler layer is provided outward of the body portion and the folded back portion of the carcass layer in the tire lateral direction. A cross-sectional area S1 of the side reinforcing layer and a hardness H1 of the side reinforcing layer, and a cross-sectional area S2 of the filler layer and a hardness H2 of the filler layer satisfy a relationship $0.12 \leq (S2 \times H2)/(S1 \times H1) \leq 0.50$.

According to an embodiment of the present technology, as described above, the ratio of the total area of rubber present in the closed region to the area of the closed region formed by the body portion and the folded back portion of the carcass layer is small, from 0.1% to 15%. Accordingly, only the bead core is substantially present in the closed region, and thus the tire weight can be reduced. In this case, the bead core has the shape described above, and the folded back portion of the carcass layer extends along the periphery of the bead core having the shape, and also extends toward the sidewall portion while contacting the body portion from the outer end position of the bead core in the tire radial direction. In addition, the side reinforcing layer and the filler layer which satisfy the relationship between the aforementioned cross-sectional areas and the aforementioned hardnesses are provided. Accordingly, even in a case where a bead filler (or a tire component similar to the bead filler) is not substantially present between the body portion and the folded back portion of the carcass layer as in a conventional tire, appropriate rigidity can be ensured in a region near the bead portion. Thus, normal traveling performance and run-flat performance can be favorably maintained. Further, in the tire according to an embodiment of the present technology, the filler layer is present as described above; however, the filler layer is disposed outward of the body portion and the folded back portion of the carcass layer in the tire lateral direction as described above and satisfies the relationship between the aforementioned cross-sectional areas and the aforementioned hardnesses. Accordingly, the filler layer differs from a conventional bead filler in that the filler layer can effectively increase the rigidity of the region near the bead portion without being an element that increases the tire weight. Furthermore, the hardness of each of the layers is a hardness (so-called JIS-A hardness) measured with a type A durometer and at a temperature of 20° C. and complying with JIS (Japanese Industrial Standard) K6253.

According to an embodiment of the present technology, an end of the folded back portion of the carcass layer is preferably in contact with the filler layer. As a result, the end of the folded back portion, which is likely to be the origin of the fracture, can be inhibited from being strained, which is advantageous to improve tire durability. Additionally, with such a structure, ultimately, the length of the folded back portion of the carcass layer can be reduced and the amount of the carcass layer used can be minimized, and thus it is also effective to reduce the tire weight.

According to an embodiment of the present technology, when the tire is mounted on a regular rim and inflated to a regular internal pressure, a rim width BW and a tire inner surface maximum width IW preferably satisfy a relationship $0.95 \leq IW/BW \leq 1.20$. The rim width BW is set to be equal to the tire inner surface maximum width IW as just described, and thus the side reinforcing layer can be formed in a good shape and run-flat performance can be improved. Moreover, according to an embodiment of the present technology, since no bead filler is substantially present as described above, the curved shape of the carcass layer can be easily changed, and the tire structure where the rim width BW and the tire inner surface maximum width IW satisfy the aforementioned relationship can be easily achieved.

According to an embodiment of the present technology, at least a portion of the bead wire is preferably layered in a trefoil shape. Accordingly, the bead wire is densely arranged, and a filling ratio thereof is increased. Thus, the bead core structure is optimized. As a result, rigidity and pressure resistance performance of the bead portion can be appropriately ensured, and the tire can be reduced in weight while maintaining running performance, and thus, advantageously, such performances can be attained in a well-balanced manner.

According to an embodiment of the present technology, when a polygon formed by common tangent lines of a plurality of circumferential portions of the bead wire in a meridian cross-section is defined as an outer shape of the bead wire, an internal angle of at least one of the corner portions located on opposite ends of one side of the outer shape, which is located inward in the tire radial direction is preferably equal to or greater than 90°. As a result, the arrangement of the bead wire can be prevented from being disturbed during vulcanization, and the bead core can have a good shape after vulcanization, which is advantageous to reduce the tire weight while ensuring excellent rigidity.

According to an embodiment of the present technology, a total thickness T1 in a tire axial direction of the sidewall portion, which is located at a tire maximum width position, and a minimum value T2 of a total thickness in the tire axial direction of the sidewall portion, which is located in a region where the filler layer is present, preferably satisfy a relationship $0.7 \leq T2/T1 \leq 1.1$. As a result, the tire shape from the tire maximum width position to the bead portion is favorably formed, which is advantageous to reduce the tire weight while ensuring excellent rigidity.

According to an embodiment of the present technology, a height h0 of the side reinforcing layer from a bead toe position, a height h1 from the bead toe position to a position at which the thickness of the filler layer is maximum, and a height h2 from the bead toe position to an end of the folded back portion of the carcass layer preferably satisfy relationships $h1 > h2$ and $0.15 \leq h1/h0 \leq 0.45$. As a result, the tire shape in the region where the filler layer is present is favorably formed, which is advantageous to reduce the tire weight while ensuring excellent rigidity.

According to an embodiment of the present technology, a length L1 along the carcass layer of a region where the side reinforcing layer and the filler layer are overlapped in a state where the carcass layer is interposed between the side reinforcing layer and the filler layer, and a length L2 along the carcass layer of a region where the body portion and the folded back portion of the carcass layer are in contact preferably satisfy a relationship $1 \leq L1/L2 \leq 5$. As a result, for reducing the tire weight while maintaining excellent rigidity, the positional relationships between components of the tire are appropriately set, and appropriate flexibility can be applied to a region from the sidewall portion to a location near the bead portion. In addition, riding comfort can be improved.

In the present technology, dimensions are measured with the tire mounted on a regular rim and inflated to a regular internal pressure. "Regular rim" is a rim defined by a standard for each tire according to a system of standards that includes standards on which tires are based, and refers to a "standard rim" in the case of JATMA, refers to a "design rim" in the case of TRA, and refers to a "measuring rim" in the case of ETRTO. In the system of standards, including standards with which tires comply, "regular internal pressure" is air pressure defined by each of the standards for each tire and is referred to as "maximum air pressure" in the case of JATMA (Japan Automobile Tyre Manufacturers Association, Inc.), the maximum value being listed in the table "TIRE ROAD LIMITS AT VARIOUS COLD INFLATION PRESSURES" in the case of TRA (The Tire and Rim Association, Inc.), and is "INFLATION PRESSURE" in the case of ETRTO (European Tire and Rim Technical Organization). However, "regular internal pressure" is 180 kPa in a case where a tire is a tire for a passenger vehicle.

DETAILED DESCRIPTION

Configurations of embodiments of the present technology will be described in detail below with reference to the accompanying drawings.

Figure 1:
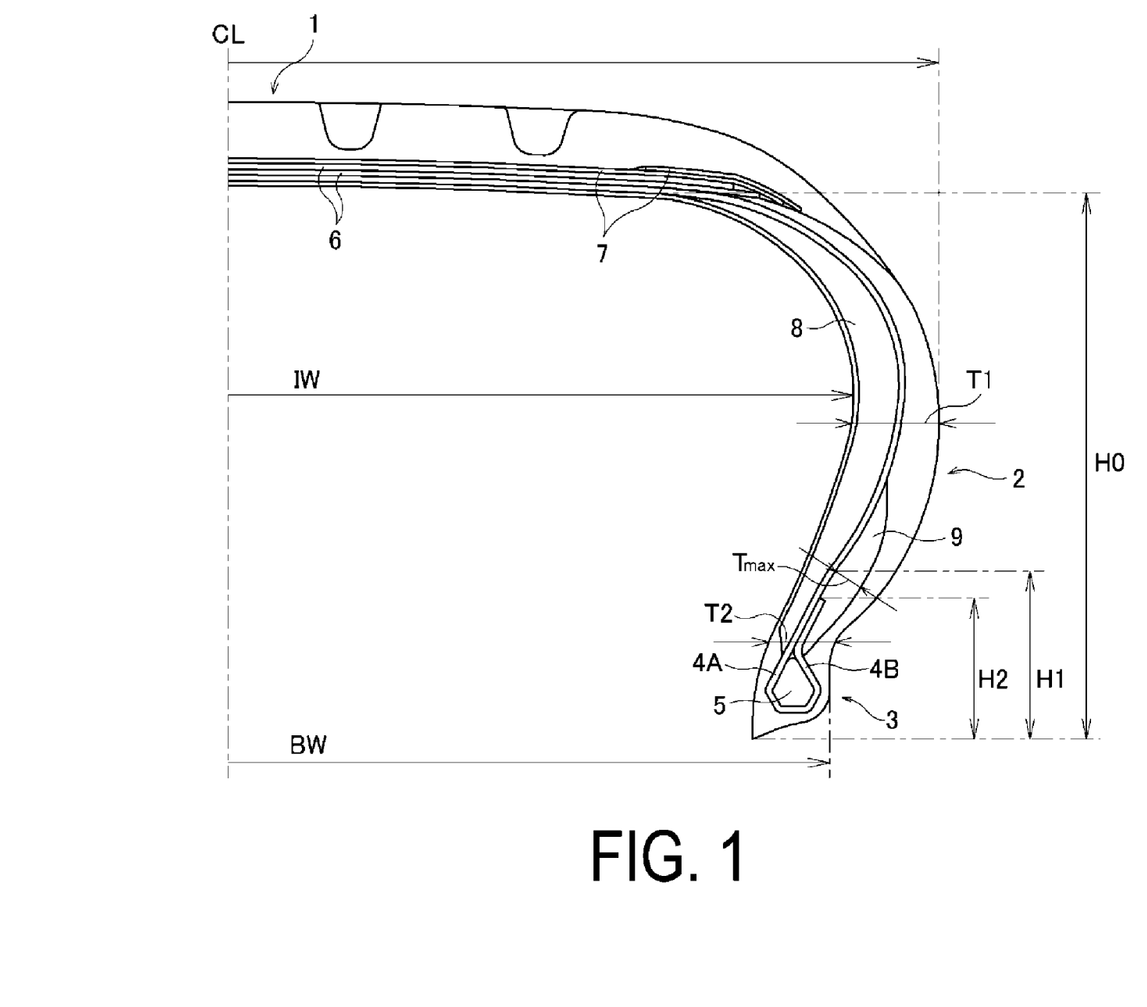
FIG. 1 is a half cross-sectional view taken along a meridian of a pneumatic tire according to an embodiment of the present technology.

As illustrated in FIG. 1, the pneumatic tire of an embodiment of the present technology includes an annular tread portion 1 extending in the tire circumferential direction, a pair of sidewall portions 2 disposed on both sides of the tread portion 1, and a pair of bead portions 3 disposed inward of the sidewall portions 2 in the tire radial direction. Note that "CL" in FIG. 1 denotes the tire equator.

A carcass layer 4 is mounted between the left-right pair of bead portions 3. The carcass layer 4 includes a plurality of reinforcing cords extending in the tire radial direction, and is folded back around a bead core 5 disposed in each of the bead portions 3 from a vehicle inner side to a vehicle outer side. In the following description, a portion of the carcass layer, which extends from the tread portion 1 through each of the sidewall portions 2 to each of the bead portions 3 is referred to as a body portion 4A, a portion of the carcass layer, which is folded back around the bead core 5 at each of the bead portions 3 to extend toward each of the sidewall portions 2, is indicated by 4B.

Figure 2:
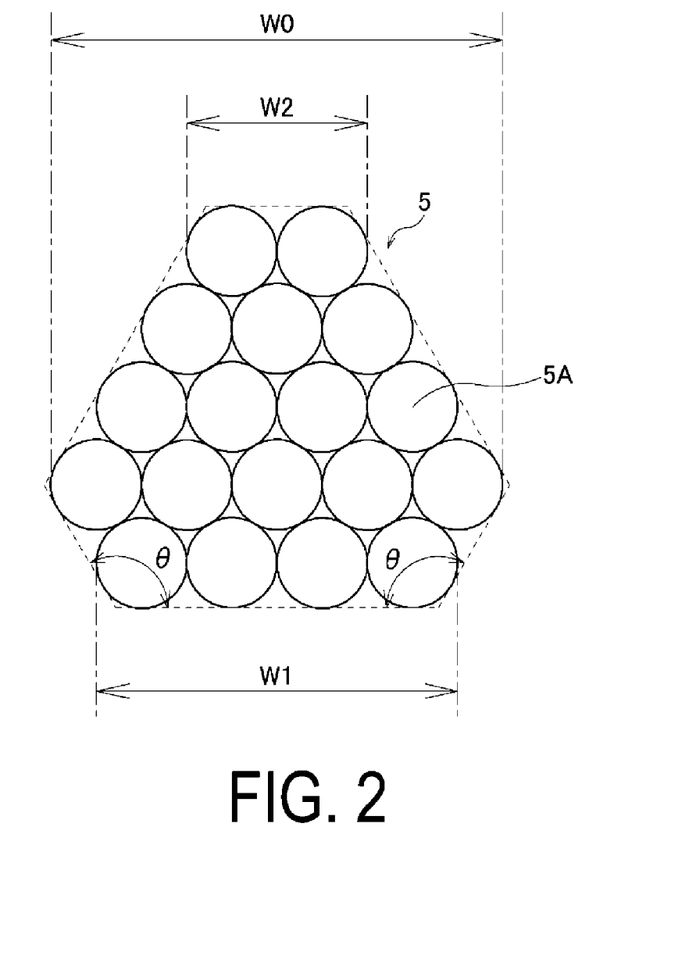
FIG. 2 is an explanatory diagram schematically illustrating a multilayer structure of a bead wire according to an embodiment of the present technology.

As illustrated in an enlarged view of FIG. 2, the bead core 5 is formed of at least one bead wire 5A wound in the tire circumferential direction, and plural circumferential portions of the bead wire 5A form plural rows aligned in the tire lateral direction and plural layers overlapping in the tire radial direction. In the present technology, as long as the plural circumferential portions of the bead wire 5A form the plural rows and the plural layers in the meridian cross-section as described above, even a so-called single winding structure in which the single bead wire 5A is continuously wound or even a so-called layer winding structure in which the plural bead wires 5A are aligned in parallel may be applied. The structure of the bead wire 5A itself is not particularly limited, but an average diameter of the bead wire 5A is preferably from 0.8 mm to 1.8 mm, more preferably from 1.0 mm to 1.6 mm, and even more preferably from 1.1 mm to 1.5 mm. Additionally, the total cross-sectional area of the bead wire 5A (the sum of the cross-sectional areas of the circumferential portions of the bead wire 5A included in the meridian cross-section of each of the bead cores 5) is preferably from 10 mm$^2$ to 50 mm$^2$, more preferably from 15 mm$^2$ to 48 mm$^2$, and even more preferably from 20 mm$^2$ to 45 mm$^2$. In the illustrated example, a structure is provided in which a total of five layers: a layer including four rows of circumferential portions; a layer including five rows of circumferential portions; a layer including four rows of circumferential portions; a layer including three rows of circumferential portions; and a layer including two rows of circumferential portions are stacked in the mentioned order from the innermost side in the tire radial direction. Note that in the following description, the structure is referred to as a "4+5+4+3+2 structure". Likewise, in the following description, the multilayer structure of the bead wire 5A is expressed in a similar format such that the number of rows included in respective layers are connected with a "+" in order from the innermost layer in the tire radial direction. Furthermore, in the bead core 5 of the illustrated example, the bead core 5A is disposed to form a multilayer structure in a trefoil shape. Note that "multilayer structure in a trefoil shape" is a stacking method in which the centers of the three circumferential portions in contact with each other form a substantially regular triangle, and is a multilayer structure also referred to as a hexagonal filling arrangement and having a high filling rate.

In this case, for each of the bead cores 5, when, of the layers configuring the bead core 5, the maximum width of one of the layers, which includes the greatest number of rows, is W1, the width of another of the layers, which is located on the innermost side in the tire radial direction, is W1, and the width of another of the layers, which is located at the outermost side in the tire radial direction, is W2, the widths satisfy the relationships W1>W2 and W2≤0.5×W0. Additionally, the layer having the greatest number of rows of the plural layers configuring the bead core 5 is located inward in the tire radial direction of the center position of the bead core 5 in the tire radial direction. Specifically, each of the bead cores 5 is formed in a tapered shape such that the width of the bead core 5 decreases from a portion located inward in the tire radial direction of the center position in the tire radial direction and having the maximum width toward the outer side in the tire radial direction (herein, such a shape may be referred to as a "radially outward side wedge shape"). Note that as illustrated, each of the widths W0 to W2 is a length extending in the tire lateral direction and defined between outer ends of the outer circumferential portions in the tire lateral direction, which are located at opposite outer sides of each of the layers in the tire lateral direction.

The carcass layer 4 is folded back around the bead core 5 as described above; however, since the bead core 5 of the present technology has a special shape (the radially outward side wedge shape) as described above, the carcass layer 4 is bent along the periphery of the bead core 5. For example, in the illustrated example, the aforementioned settings are satisfied by the bead core 5, and thus the cross-sectional shape is substantially pentagonal. Accordingly, the carcass layer 4 extending along the periphery of the bead core 5 is also bent into a substantially pentagonal shape. Moreover, a portion of the folded back portion 4B of the carcass layer 4, which is located outward of a radially outward end of the bead core 5 in the tire radial direction extends along the body portion 4A of the carcass layer 4 toward each of the sidewall portions 2 while contacting the body portion 4A of the carcass layer 4. As a result, the body portion 4A and the folded back portion 4B of the carcass layer 4 form a closed region that surrounds the bead core 5.

In an embodiment of the present technology, only the bead core 5 is substantially present in the closed region. In other words, even in the presence of an insulating rubber that covers the bead wire 5A or a rubber that fills a slight gap formed between the bead core 5 and the carcass layer 4, a bead filler having a large volume as in a conventional pneumatic tire is not present. In particular, an occupancy ratio of the rubber in the closed region, i.e., a ratio of the total area a of the rubber present in the closed region to the area A of the closed region in the meridian cross-section (a/A×100%) is from 0.1% to 15%.

Belt layers 6 of plural layers (in the illustrated example, two layers) are embedded on the outer circumferential side of the carcass layer 4 in the tread portion 1. Each of the belt layers 6 includes plural reinforcing cords inclined with respect to the tire circumferential direction. The reinforcing cords are arranged such that the reinforcing cords intersect one another between the layers. The belt layers 6 are set such that an inclination angle of the reinforcing cords with respect to the tire circumferential direction ranges, for example, from 10° to 40°. In addition, belt reinforcing layers 7 are provided on the outer circumferential side of the belt layers 6. In particular, in the illustrated example, two layers are provided: a full cover layer covering the entire width of the belt layers 6 and an edge cover layer covering only either end of the belt reinforcing layer 7. The belt reinforcing layers 7 include organic fiber cords oriented in the tire circumferential direction. The belt reinforcing layers 7 are set such that an angle of the organic fiber cords with respect to the tire circumferential direction ranges, for example, from 0° to 5°.

A side reinforcing layer 8 formed in a crescent shape in cross-section is disposed inward of the carcass layer 4 in the sidewall portion 2 in the tire lateral direction. The side reinforcing layer 8 is made of rubber harder than another rubber configuring the sidewall portion 2. Specifically, the rubber configuring the side reinforcing layer 8 has a JIS-A hardness of, for example, 70 to 80 and a modulus of, for example, 9.0 Mpa to 10.0 MPa at an elongation of 100%. The side reinforcing layer 8 having such physical properties supports, based on the rigidity thereof, a load and allows for run-flat traveling when the tire is punctured.

A filler layer 9 is disposed outward of the carcass layer 4 (the body portion 4A and the folded back portion 4B) in the sidewall portion 2 in the tire lateral direction. The filler layer 9 is different from a bead filler provided between the body portion 4A and the folded back portion 4B of the carcass layer 4 in a conventional pneumatic tire in that the filler layer 9 is adapted to secure the rigidity of the sidewall portion 2 in conjunction with the aforementioned side reinforcing layer 8. Accordingly, the following relationships of the cross-sectional area S2 of the filler layer 9 and the hardness H2 of the filler layer 9 to the cross-sectional area S1 of the side reinforcing layer 8 and the hardness H1 of the side reinforcing layer 8 certainly satisfy the relationship $0.12 \leq (S2 \times H2)/(S1 \times H1) \leq 0.50$.

As described above, the occupancy rate of the rubber in the closed region is small, from 0.1% to 15%, and only the bead core 5 is substantially present in the closed region. Thus, the tire weight can be reduced. In this case, the bead core 5 has the aforementioned shape, and the carcass layer 4 is folded back as described above. In addition, the side reinforcing layer 8 and the filler layer 9 which satisfy the relationship of the aforementioned cross-sectional areas and the aforementioned hardnesses are provided. Accordingly, even in a case where a bead filler (or a tire component similar to the bead filler) is not substantially present between the body portion 4A and the folded back portion 4B of the carcass layer 4 as in a conventional tire, appropriate rigidity can be ensured in a region near the bead portion 3. Thus, normal traveling performance and run-flat performance can be favorably maintained. Specifically, when the tire is mounted on a rim, the rim flange is in contact with the outer side of the bead portion 3, and the rigidity of a portion of the bead portion 3 contacting the rim flange is secured by the presence of the rim flange. Accordingly, the bead core 5 has the aforementioned shape and the carcass layer 4 is folded back as described above, and thus sufficient rigidity can be ensured even when the conventional bead filler is eliminated. In addition, the aforementioned filler layer 9 is provided, and thus the sufficient rigidity can be surely obtained. Note that since the filler layer 9 is disposed outward of the body portion 4A and the folded back portion 4B of the carcass layer 4 in the tire lateral direction as described above and satisfies the relationship between the aforementioned cross-sectional areas and the aforementioned hardnesses, the filler layer 9 differs from the conventional bead filler in that the filler layer 9 can effectively increase the rigidity of the region near the bead portion 3 without being an element that increases the tire weight.

In the aforementioned structure, when the widths W0, W1, and W2 do not satisfy the relationships described above, the shape of the bead core 5 is inappropriate, and thus the shape of the bead portion 3 cannot be stabilized. In particular, when the relationships $W1 \leq W2$ and $W2 > 0.5 \times W0$ are established, the width of an upper end of the bead core 5 is increased. Accordingly, as long as a bead filler (or a tire component similar to the bead filler) is not used, the carcass layer 4 is significantly bent around the bead core 5, and an effect of reducing the tire weight while securing the rigidity is not obtained. When the occupancy ratio of the rubber in the closed region is greater than 15%, the tire is substantially equivalent to a conventional pneumatic tire including a bead filler, and thus it is difficult to reduce the tire weight. Note that since an insulating rubber or the like covering the bead wire 5A is always present in the tire structure, the occupancy ratio of the rubber in the closed region is basically not below 0.1%. When the cross-sectional area and hardness of the side reinforcing layer 8 and the cross-sectional area and hardness of the filler layer 9 do not satisfy the relationship described above, the rigidity of the bead portion 3 cannot be appropriately ensured. In particular, when $(S2 \times H2)/(S1 \times H1) < 0.12$ is established, the rigidity of the bead portion 3 is insufficient, and thus rim disengagement easily occurs. When $(S2 \times H2)/(S1 \times H1) > 0.50$ is established, the rigidity of the bead portion 3 is excessive, which may affect basic running performance of the tire.

The specific shape of the bead core 5 is not particularly limited as long as the widths W0, W1, and W2 satisfy the relationships described above. For example, the shapes illustrated in FIGS. 3 and 4 can be employed. In the examples of FIGS. 3 and 4, any of the widths W0, W1, and W2 satisfy the relationships described above, and thus the "radially outward side wedge shape" of the present technology applies. Specifically, multi-stacking in a trefoil shape of a 3+4+3+2+1 structure is provided in FIG. 3A. Multi-stacking in a trefoil shape of a 3+4+3+2 structure is provided in FIG. 3B. Multi-stacking in a trefoil shape of a 4+5+4+3+2+1 structure is provided in FIG. 3C. Multi-stacking in a trefoil shape of a 3+4+4+3+2+1 structure is provided in FIG. 3D. Moreover, multi-stacking in a trefoil shape of a 5+4+3+2+1 structure is provided in FIG. 4A, and multi-stacking in a trefoil shape of a 4+4+3+2+1 structure is provided in FIG. 4B. A 4+4+3+2+1 structure is provided in FIG. 4C in which the layer located on the innermost side in the tire radial direction and the layer located adjacent to the layer located on the innermost side in the tire radial direction are stacked in series (in a stacking manner such that the circumferential portions located side by side in the tire radial direction are stacked vertically in the tire lateral direction).

In any of the structures illustrated in FIGS. 3 and 4, at least a portion of the bead wire 5A is multi-stacked in a trefoil shape, and thus the bead wire 5A can be densely disposed with the filling rate of the bead wire 5A increased compared with a bead wire multi-stacked in series as a whole. As a result, rigidity and pressure resistance performance of the bead portion 3 can be appropriately ensured, and the tire can be reduced in weight while maintaining running performance, and thus such performances can be attained in a well-balanced manner. Focusing on the filling rate of the bead wire 5A, all of the bead wires 5A are preferably multi-stacked in a trefoil shape as in FIGS. 3A to 3D and FIGS. 4A to 4B.

Further, for the shape of the bead core 5, when a polygonal shape formed by common tangent lines (dashed lines in the diagram) of the plural circumferential portions of the bead wire 5A in the meridian cross-section is defined as an outer shape of the bead wire 5A, at least one of internal angles of corner portions located on opposite ends of one side of the outer shape, which is located inward in the tire radial direction, is preferably equal to or greater than 90°. As a result, the arrangement of the bead wire 5A can be prevented from being disturbed during vulcanization, and the bead core 5 can have a good shape after vulcanization, which is advantageous to reduce the tire weight while ensuring excellent rigidity. When the internal angle α is below 90°, portions of the bead wire 5A, which are located on the opposite ends of the side of the outer shape, which is located inward in the tire radial direction are easily affected by a flow of rubber during vulcanization, and thus, it is difficult to maintain the bead core 5 in a good shape after vulcanization. From this perspective of the outer shape, the bead core 5 is preferably formed in a shape as illustrated in FIGS. 3A to 3D and FIGS. 4B to 4C, and in particular, the bead core 5 is preferably formed in a shape as illustrated in FIGS. 3A to 3D and FIG. 4C.

Additionally, for the shape of the bead core 5, in order to increase the stability of the overall shape of the bead core 5, the overall shape of the bead core 5 is preferably designed to be linearly symmetrical with respect to the center of the bead core 5 in the tire lateral direction. From this perspective, the shapes as in FIGS. 3A to 3C and FIGS. 4A and 4C are preferable.

The aforementioned various shapes of the bead cores 5 can be appropriately selected based on the aforementioned various perspectives in consideration of the overall structure of the pneumatic tire or in consideration of characteristics to be emphasized.

Since no bead filler is substantially present in the pneumatic tire according to an embodiment of the present technology as described above, the curved shape of the carcass layer 4 can be easily set. Accordingly, the structure of the carcass layer 4 suitable as a run-flat tire and the shape and arrangement of the suitable side reinforcing layer 8 obtained by the carcass structure can be easily configured. For example, when the tire is mounted on a regular rim and inflated to a regular internal pressure, the rim width BW and the tire inner surface maximum width IW preferably satisfy the relationship $0.95 \leq IW/BW \leq 1.20$. The rim width BW is set to be equal to the tire inner surface maximum width IW as just described, and thus the side reinforcing layer 8 can be formed in a good shape and run-flat performance can be improved. Note that in the diagrams, the rim is not illustrated and only the dimension line indicating the rim width BW is illustrated.

In the embodiment illustrated in FIG. 1, an end of the folded back portion 4B of the carcass layer 4 is in contact with the filler layer 9. In other words, the carcass layer 4 (the folded back portion 4B) is terminated in a region where the filler layer 9 is present. With such a structure, the end of the folded back portion 4B, which is likely to be the origin of the fracture, can be inhibited from being strained, which is advantageous to improve tire durability. Additionally, with such a structure, the length of the folded back portion 4B of the carcass layer 4 can be reduced and the amount of the carcass layer 4 used can be minimized, and thus it is also effective to reduce the tire weight.

Figure 5:
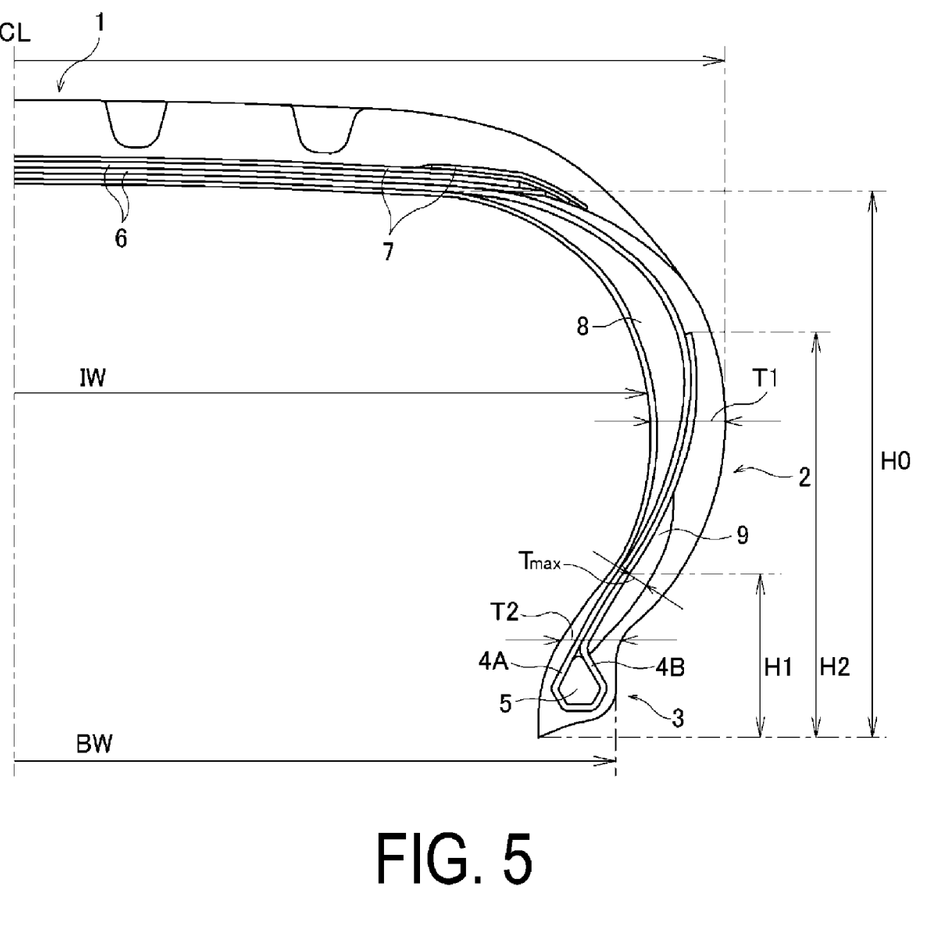
FIG. 5 is a meridian cross-sectional view of a pneumatic tire according to another embodiment of the present technology.

Of course, as in an embodiment illustrated in FIG. 5, the folded back portion 4B of the carcass layer 4 may be extended beyond the region where the filler layer 9 is present, and the end of the folded back portion 4B of the carcass layer 4 may be disposed outward of the filler layer 9 in the tire radial direction. In this case, in a region where the body portion 4A and the folded back portion 4B of the carcass layer 4 are overlapped, the reinforcement effect by the carcass layer 4 increases. Thus, even when the volume of the side reinforcing layer 8 is reduced as illustrated, the same rigidity as that of the structure illustrated in FIG. 1 or the like can be ensured. As a result, an increase in mass due to the increase in the amount of the carcass layer 4 used can be offset by the reduction in the amount of the side reinforcing layer 8 used, and thus an influence on reduction in tire weight can be minimized.

In the present technology, since the side reinforcing layer 8 and the filler layer 9 are provided, the sidewall portion 2 tends to be entirely thick. Accordingly, the total thickness T1 in the tire axial direction of the sidewall portion 2, which is located at the tire maximum width position, and the minimum value T2 of the total thickness in the tire axial direction of the sidewall portion 2, which is located in the region where the filler layer 9 is present, satisfy the relationship $0.7 \leq T2/T1 \leq 1.1$. The thickness of each of the components is set as just described, and thus the tire shape from the tire maximum width position to the bead portion 3 can be favorably formed, which is advantageous to reduce the tire weight while ensuring excellent rigidity. When the ratio T2/T1 is below 0.7, the total thickness of the sidewall portion 2 in the tire axial direction, which is located in the region where the filler layer 9 is present, is relatively small, which makes it difficult to sufficiently ensure the durability of the bead portion 3. When the ratio T2/T1 is greater than 1.1, the thickness of the sidewall portion 2 is entirely increased, which makes it difficult to sufficiently reduce the tire weight.

In addition, with respect to the structure of the side reinforcing layer 9, a height h0 of the side reinforcing layer 9 from the bead toe position, a height h1 from the bead toe position to a position at which a thickness Tmax of the filler layer 9 is maximum, and a height h2 from the bead toe position to the end of the folded back portion 4B of the carcass layer 4 satisfy the relationships h1>h2 and $0.15 \leq h1/h0 \leq 0.45$. As a result, the tire shape in the region where the filler layer 9 is present is further improved, which is advantageous to reduce the tire weight while ensuring excellent rigidity.

Figure 6:
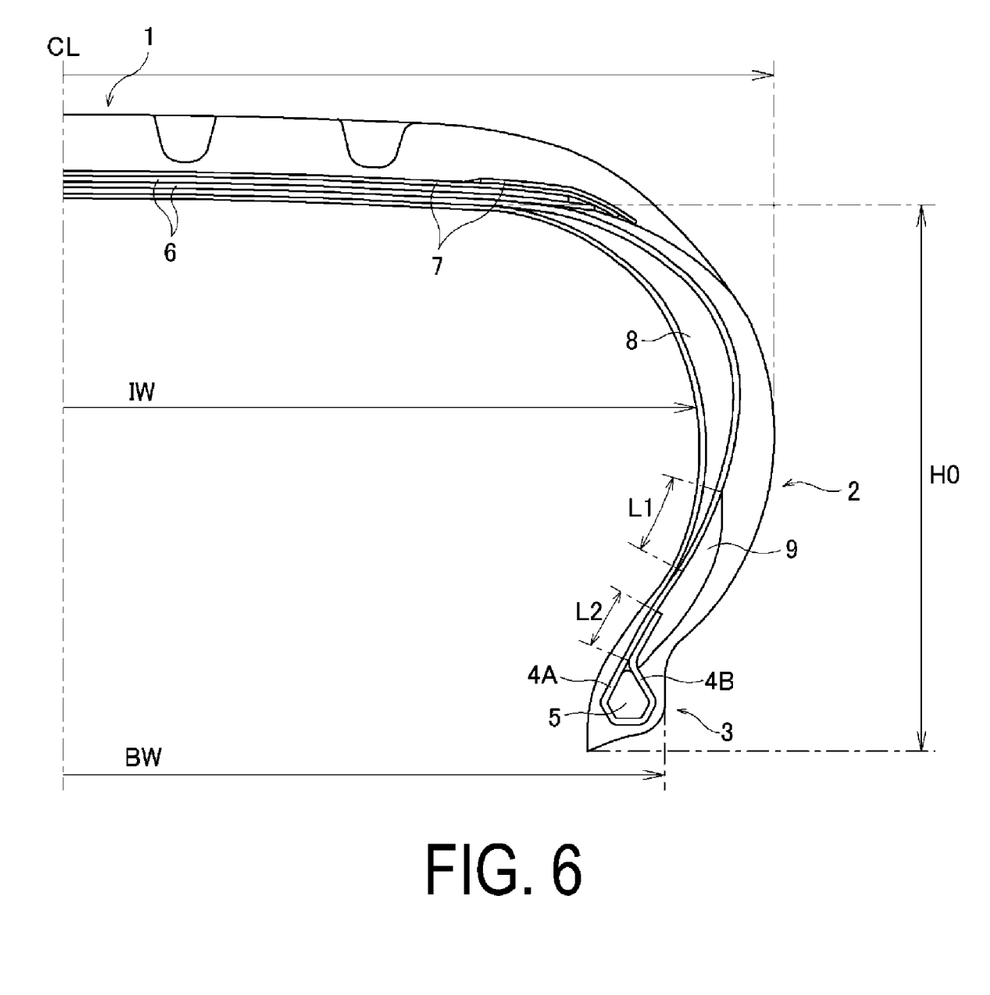
FIG. 6 is a meridian cross-sectional view of a pneumatic tire according to another embodiment of the present technology.

In an embodiment illustrated in FIG. 6, the side reinforcing layer 8 does not extend to a location near an end of the carcass layer 4, which is located inward in the tire radial direction, as in the embodiment of FIG. 1, and an end portion of the side reinforcing layer 8, which is located inward in the tire radial direction, is located at a middle portion of the filler layer 9 in the tire radial direction. In other words, when the sidewall portion 2 is viewed in the tire lateral direction, a region where only the carcass layer 4 and the filler layer 9 are present and the side reinforcing layer 8 is not present inward of the carcass layer 4 in the tire lateral direction is formed. In this case, the length L1 along the carcass layer 4 of a region where the side reinforcing layer 8 and the filler layer 9 are overlapped with the carcass layer 4 in a state where the carcass layer 4 is interposed between the side reinforcing layer 8 and the filler layer 9 and the length L2 along the carcass layer 4 of a region where the body portion 4A and the folded back portion 4B of the carcass layer 4 are in contact preferably satisfy the relationship $1 \leq L1/L2 \leq 5$. The positional relationships among the folded back portion 4B of the carcass layer 4, the side reinforcing layer 8, and the filler layer 9 are appropriately set as just described, and thus, in order to reduce the tire weight while maintaining excellent rigidity, appropriate flexibility can be applied to a region from the sidewall portion 2 to a location near the bead portion 3, and riding comfort can be improved. In this case, when the ratio L1/L2 is less than 1, the side reinforcing layer 8 and the filler layer 9 are not sufficiently overlapped, which makes it difficult to ensure appropriate rigidity. When the ratio L1/L2 is greater than 5, the side reinforcing layer 8 and the filler layer 9 are largely overlapped and the rigidity of the sidewall portion 2 increases, and thus an effect of applying flexibility cannot be sufficiently expected.

The structures of the respective components described above can be combined and applied as appropriate. In any case, in the pneumatic tire structured as described above, the structure of the bead portion 3 is improved, and thus the tire can be reduced in weight while maintaining the durability.

EXAMPLE

Thirty-six types of pneumatic tires according to Conventional Example 1, Comparative Examples 1 to 4, and Examples 1 to 31 were manufactured. Each of the pneumatic tires had a tire size of 205/55R16 and the basic structure illustrated in FIG. 1, and was set as listed in Tables 1 to 4 for: the presence or absence of the bead filler disposed between the body portion and the folded back portion of the carcass layer, the presence or absence of the filler layer disposed outward of the body portion and the folded back portion of the carcass layer in the tire lateral direction, the structure of the bead core, the maximum width W0 of the bead core, the width W1 of the innermost layer of the bead core in the tire radial direction, the width W of the outermost layer of the bead core in the tire radial direction, the size relationship between the widths W1 and W2, the ratio W2/W0, the occupancy ratio of rubber in the closed region, the cross-sectional area S1 and hardness H1 of the side reinforcing layer, the cross-sectional area S2 and hardness H2 of the filler layer, (S2×H2)/(S1×H1), the position of the end of the folded back portion of the carcass layer, the ratio IW/BW of the tire inner surface maximum width IW to the rim width BW when the tire is mounted on a regular rim and inflated to a regular internal pressure, the internal angles θ of the corner portions located on the opposite ends of one side of the outer shape of the bead wire, which is located inward in the tire radial direction, the ratio T2/T1 of the minimum value T2 of the total thickness in the tire axial direction of the sidewall portion, which is located in the region where the filler layer is present, to the total thickness T1 in the tire axial direction of the sidewall portion, which is located at the tire maximum width position, the height h0 of the side reinforcing layer from the bead toe position, the height h1 from the bead toe position to a position at which the thickness Tmax of the filler layer is maximum, the height h2 from the bead toe position to the end of the folded back portion of the carcass layer, the size relationship between the heights h1 and h2, the ratio h1/h0, and the ratio L1/L2 of the length L1 along the carcass layer of a region where the side reinforcing layer and the filler layer are overlapped with the carcass layer in a state where the carcass layer is interposed between the side reinforcing layer and the filler layer to the length L2 along the carcass layer of a region where the body portion and the folded back portion of the carcass layer are in contact.

The numbers of the diagrams indicating the corresponding structure are indicated in the columns of "Bead core structure" in Tables 1 to 4. However, for Conventional Example 1, all of the bead wires are layered in series to form a 5+5+5+5 structure, and thus "5+5+5+5" is indicated in the table. Further, since Comparative Example 3 has a structure in which the top and bottom of the bead core of FIG. 2 are reversed, "FIG. 2 (reversed)" is indicated. For the columns of "position of the end of the folded back portion" in Tables 1 to 3, in a case where the end of the folded back portion is located in the region where the filler layer is present, "lateral to filler" is indicated, and in a case where the end of the folded back portion is located outward of the outer end of the filler layer in the tire radial direction, "outward of filler" is indicated. However, in Conventional Example 1, no filler layer is provided, but the bead filler is provided, and the end of the folded back portion is located outward in the tire radial direction of the outer end of the bead filler in the tire radial direction, and thus "outward of BF" is indicated. The internal angle θ of each of the corner portions located on the opposite ends of one side of the outer shape of the bead wire, which is located inward in the tire radial direction, is also indicated in the columns of "Internal angle θ" of Tables 1 to 3.

For the pneumatic tires, the tire mass and the run-flat durability were evaluated in accordance with the evaluation methods described below. Results of the evaluation are also indicated in Tables 1 to 4.

Tire Mass

For each test tire, the masses of five tires were measured, and an average value of the tires was calculated. Evaluation results are expressed as index values with Conventional Example 1 being assigned the index value of 100. Smaller index values indicate smaller tire mass.

Run-Flat Durability

Each of the test tires was assembled on a wheel having a rim size of 16×6.5 J and allowed to run on a drum testing machine under drum durability test conditions for run-flat tires, which are described in ECE (Economic Commission for Europe) 30, and the running distance until the tire was damaged or fractured was measured. Evaluation results are expressed as index values with Conventional Example 1 being assigned the index value of 100. Larger index values indicate superior run-flat durability.

TABLE 1

|  |  | Conventional Example 1 | Comparative Example 1 | Example 1 | Example 2 | Example 3 |
| --- | --- | --- | --- | --- | --- | --- |
| Presence/absence of bead filler |  | Yes | No | No | No | No |
| Presence/absence of filler layer |  | No | Yes | Yes | Yes | Yes |
| Bead core structure |  | 5 + 5 + 5 + 5 | FIG. 2 | FIG. 2 | FIG. 2 | FIG. 2 |
| W0 | mm | 4.0 | 7.0 | 7.0 | 7.0 | 7.0 |
| W1 | mm | 4.0 | 5.5 | 5.5 | 5.5 | 5.5 |
| W2 | mm | 4.0 | 3.0 | 3.0 | 3.0 | 3.0 |
| Size relationship |  | W1 = W2 | W1 > W2 | W1 > W2 | W1 > W2 | W1 > W2 |
| W2/W0 |  | 1 | 0.43 | 0.43 | 0.43 | 0.43 |
| Rubber occupancy | % | 350 | 7 | 7 | 7 | 7 |
| S1 | mm$^2$ | — | 720 | 720 | 580 | 520 |
| H1 |  | — | 78 | 78 | 78 | 78 |
| S2 | mm$^2$ | — | 90 | 128 | 138 | 195 |
| H2 |  | — | 70 | 71 | 82 | 84 |
| (S2 × H2)/(S1 × H1) |  | — | 0.11 | 0.16 | 0.25 | 0.40 |
| Position of end of folded back portion |  | Outward of BF | Lateral to filler | Lateral to filler | Lateral to filler | Lateral to filler |
| IW/BW |  | 1.18 | 1.00 | 1.10 | 1.05 | 1.00 |
| Internal angle θ | ° | 90 | 120 | 120 | 120 | 120 |
|  |  | 90 | 120 | 120 | 120 | 120 |
| T2/T1 |  | 1.05 | 0.72 | 0.78 | 0.85 | 0.87 |
| h0 | mm | 96 | 96 | 96 | 96 | 96 |
| h1 | mm | — | 28 | 30 | 35 | 38 |
| h2 | mm | 55 | 26 | 24 | 24 | 24 |

TABLE 1-continued

|  |  |  |  |  |  |
|---|---|---|---|---|---|
| Size relationship | | — | h1 > h2 | h1 > h2 | h1 > h2 | h1 > h2 |
| h1/h0 | | — | 0.29 | 0.31 | 0.36 | 0.4 |
| L1/L2 | | — | 3.3 | 3.3 | 2.9 | 2.8 |
| Tire mass | Index value | 100 | 97 | 99 | 98 | 98 |
| Run-flat durability | Index value | 100 | 96 | 106 | 104 | 108 |

|  |  | Example 4 | Comparative Example 2 | Comparative Example 3 | Example 5 |
|---|---|---|---|---|---|
| Presence/absence of bead filler | | No | No | No | No |
| Presence/absence of filler layer | | Yes | Yes | Yes | Yes |
| Bead core structure | | FIG. 2 | FIG. 2 | FIG. 2 (reversed) | FIG. 2 |
| W0 | mm | 7.0 | 7.0 | 7.0 | 7.0 |
| W1 | mm | 5.5 | 5.5 | 3.0 | 5.5 |
| W2 | mm | 3.0 | 3.0 | 5.5 | 3.0 |
| Size relationship | | W1 > W2 | W1 > W2 | W1 < W2 | W1 > W2 |
| W2/W0 | | 0.43 | 0.43 | 0.79 | 0.43 |
| Rubber occupancy | % | 7 | 7 | 7 | 0.1 |
| S1 | mm² | 500 | 450 | 580 | 580 |
| H1 | | 74 | 72 | 78 | 78 |
| S2 | mm² | 210 | 210 | 138 | 138 |
| H2 | | 88 | 94 | 82 | 82 |
| (S2 × H2)/(S1 × H1) | | 0.50 | 0.61 | 0.25 | 0.25 |
| Position of end of folded back portion | | Lateral to filler | Lateral to filler | Lateral to filler | Lateral to filler |
| IW/BW | | 0.97 | 0.95 | 1.05 | 1.05 |
| Internal angle θ | ° | 120 | 120 | 120 | 120 |
|  |  | 120 | 120 | 120 | 120 |
| T2/T1 | | 0.9 | 1.00 | 0.85 | 0.85 |
| h0 | mm | 96 | 96 | 96 | 96 |
| h1 | mm | 40 | 43 | 28 | 28 |
| h2 | mm | 22 | 20 | 23 | 23 |
| Size relationship | | h1 > h2 | h1 > h2 | h1 > h2 | h1 > h2 |
| h1/h0 | | 0.42 | 0.45 | 0.29 | 0.29 |
| L1/L2 | | 2.7 | 2.5 | 2.9 | 2.9 |
| Tire mass | Index value | 98 | 97 | 98 | 98 |
| Run-flat durability | Index value | 104 | 98 | 92 | 104 |

TABLE 2

Figure 3A:
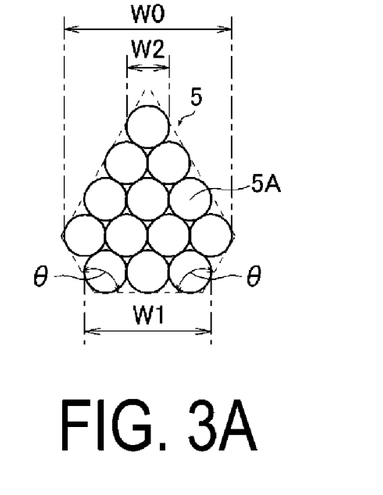
FIGS. 3A to 3C are explanatory diagrams schematically illustrating multilayer structures of a bead wire according to embodiments of the present technology.
Figure 3B:
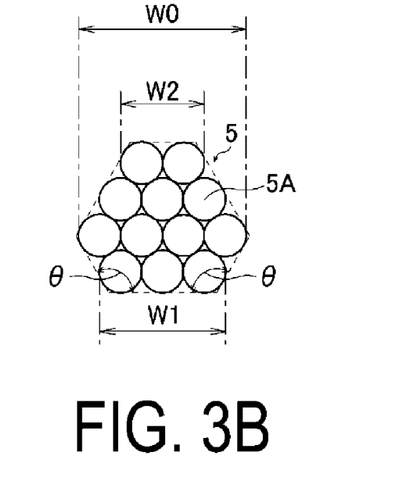
Figure 3C:
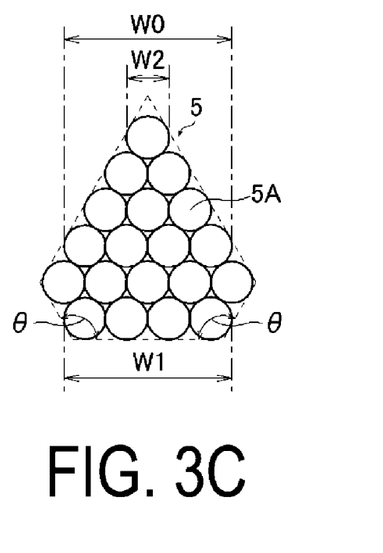
Figure 4A:
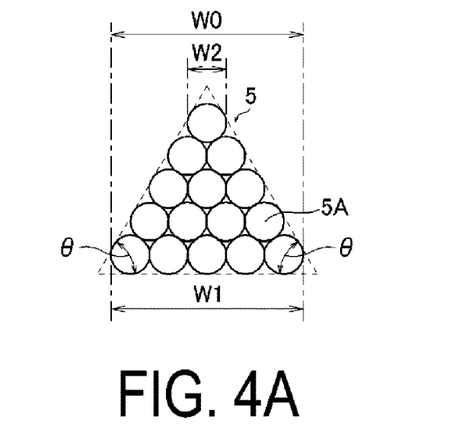
FIG. 4 is an explanatory diagram schematically illustrating multilayer structures of a bead wire according to embodiments of the present technology.
Figure 4B:
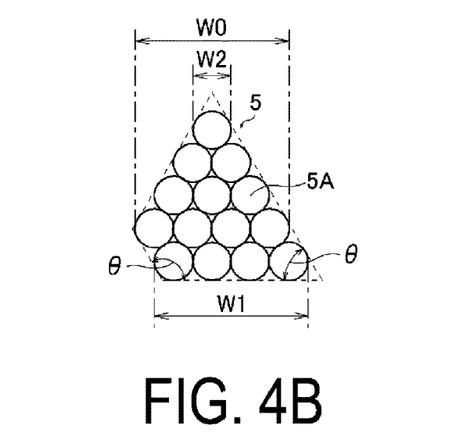
Figure 4C:
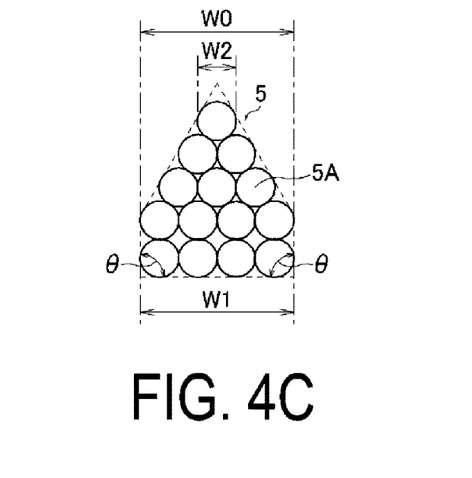

|  |  | Example 6 | Comparative Example 4 | Example 7 | Example 8 | Example 9 |
|---|---|---|---|---|---|---|
| Presence/absence of bead filler | | No | No | No | No | No |
| Presence/absence of filler layer | | Yes | Yes | Yes | Yes | Yes |
| Bead core structure | | FIG. 2 | FIG. 2 | FIG. 3A | FIG. 3B | FIG. 3C |
| W0 | mm | 7.0 | 7.0 | 5.5 | 5.5 | 7.0 |
| W1 | mm | 5.5 | 5.5 | 4.2 | 4.2 | 5.5 |
| W2 | mm | 3.0 | 3.0 | 1.4 | 3.0 | 1.4 |
| Size relationship | | W1 > W2 | W1 > W2 | W1 > W2 | W1 > W2 | W1 > W2 |
| W2/W0 | | 0.43 | 0.43 | 0.25 | 0.55 | 0.2 |
| Rubber occupancy | % | 15 | 20 | 7 | 7 | 7 |
| S1 | mm² | 580 | 580 | 580 | 580 | 580 |
| H1 | | 78 | 78 | 78 | 78 | 78 |
| S2 | mm² | 138 | 138 | 138 | 138 | 138 |
| H2 | | 82 | 82 | 82 | 82 | 82 |
| (S2 × H2)/(S1 × H1) | | 0.25 | 0.25 | 0.25 | 0.25 | 0.25 |
| Position of end of folded back portion | | Lateral to filler | Lateral to filler | Lateral to filler | Lateral to filler | Lateral to filler |
| IW/BW | | 1.05 | 1.05 | 1.00 | 1.00 | 1.00 |
| Internal angle θ | ° | 120 | 120 | 120 | 120 | 120 |
|  |  | 120 | 120 | 120 | 120 | 120 |
| T2/T1 | | 0.85 | 0.85 | 0.85 | 0.85 | 0.85 |
| h0 | mm | 96 | 96 | 96 | 96 | 96 |
| h1 | mm | 28 | 28 | 35 | 35 | 35 |
| h2 | mm | 23 | 23 | 23 | 23 | 23 |
| Size relationship | | h1 > h2 | h1 > h2 | h1 > h2 | h1 > h2 | h1 > h2 |

TABLE 2-continued

|  |  |  |  |  |  |  |
|---|---|---|---|---|---|---|
| h1/h0 |  | 0.29 | 0.29 | 0.36 | 0.36 | 0.36 |
| L1/L2 |  | 2.9 | 2.9 | 2.9 | 2.9 | 2.9 |
| Tire mass | Index value | 98 | 99 | 96 | 96 | 96 |
| Run-flat durability | Index value | 104 | 98 | 106 | 106 | 106 |

Figure 3D:
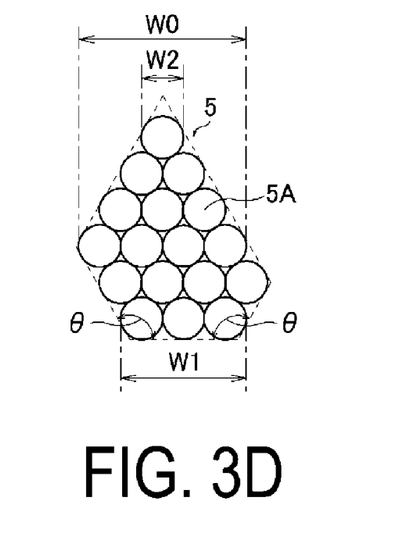

|  |  | Example 10 | Example 11 | Example 12 | Example 13 | Example 14 |
|---|---|---|---|---|---|---|
| Presence/absence of bead filler |  | No | No | No | No | No |
| Presence/absence of filler layer |  | Yes | Yes | Yes | Yes | Yes |
| Bead core structure |  | FIG. 3D | FIG. 4A | FIG. 4B | FIG. 4C | FIG. 2 |
| W0 | mm | 5.5 | 7.0 | 5.5 | 5.5 | 7.0 |
| W1 | mm | 4.2 | 7.0 | 5.5 | 5.5 | 5.5 |
| W2 | mm | 1.4 | 1.4 | 1.4 | 1.4 | 3.0 |
| Size relationship |  | W1 > W2 | W1 > W2 | W1 > W2 | W1 > W2 | W1 > W2 |
| W2/W0 |  | 0.25 | 0.2 | 0.25 | 0.25 | 0.43 |
| Rubber occupancy | % | 7 | 7 | 7 | 7 | 7 |
| S1 | mm² | 580 | 580 | 580 | 580 | 580 |
| H1 |  | 78 | 78 | 78 | 78 | 78 |
| S2 | mm² | 138 | 138 | 138 | 138 | 138 |
| H2 |  | 82 | 82 | 82 | 82 | 82 |
| (S2 × H2)/(S1 × H1) |  | 0.25 | 0.25 | 0.25 | 0.25 | 0.25 |
| Position of end of folded back portion |  | Lateral to filler | Lateral to filler | Lateral to filler | Lateral to filler | Outward of filler |
| IW/BW |  | 1.00 | 1.00 | 1.00 | 1.00 | 1.00 |
| Internal angle θ | ° | 120 | 60 | 120 | 90 | 120 |
|  |  | 120 | 60 | 60 | 90 | 120 |
| T2/T1 |  | 0.85 | 0.85 | 0.85 | 0.85 | 0.85 |
| h0 | mm | 96 | 96 | 96 | 96 | 96 |
| h1 | mm | 35 | 35 | 35 | 35 | 35 |
| h2 | mm | 23 | 23 | 23 | 23 | 50 |
| Size relationship |  | h1 > h2 | h1 > h2 | h1 > h2 | h1 > h2 | h1 < h2 |
| h1/h0 |  | 0.36 | 0.36 | 0.36 | 0.36 | 0.36 |
| L1/L2 |  | 2.9 | 2.9 | 2.9 | 2.9 | 2.9 |
| Tire mass | Index value | 96 | 96 | 96 | 96 | 97 |
| Run-flat durability | Index value | 106 | 102 | 102 | 103 | 104 |

TABLE 3

|  |  | Example 15 | Example 16 | Example 17 | Example 18 |
|---|---|---|---|---|---|
| Presence/absence of bead filler |  | No | No | No | No |
| Presence/absence of filler layer |  | Yes | Yes | Yes | Yes |
| Bead core structure |  | FIG. 2 | FIG. 2 | FIG. 2 | FIG. 2 |
| W0 | mm | 7.0 | 7.0 | 7.0 | 7.0 |
| W1 | mm | 5.5 | 5.5 | 5.5 | 5.5 |
| W2 | mm | 3.0 | 3.0 | 3.0 | 3.0 |
| Size relationship |  | W1 > W2 | W1 > W2 | W1 > W2 | W1 > W2 |
| W2/W0 |  | 0.43 | 0.43 | 0.43 | 0.43 |
| Rubber occupancy | % | 7 | 7 | 7 | 7 |
| S1 | mm² | 580 | 580 | 580 | 580 |
| H1 |  | 78 | 78 | 78 | 78 |
| S2 | mm² | 138 | 138 | 138 | 138 |
| H2 |  | 82 | 82 | 82 | 82 |
| (S2 × H2)/(S1 × H1) |  | 0.25 | 0.25 | 0.25 | 0.25 |
| Position of end of folded back portion |  | Lateral to filler | Lateral to filler | Lateral to filler | Lateral to filler |
| IW/BW |  | 0.95 | 1.1 | 1.15 | 1.2 |
| Internal angle θ | ° | 120 | 120 | 120 | 120 |
|  |  | 120 | 120 | 120 | 120 |
| T2/T1 |  | 0.85 | 0.85 | 0.85 | 0.85 |
| h0 | mm | 96 | 96 | 96 | 96 |
| h1 | mm | 35 | 35 | 35 | 35 |
| h2 | mm | 23 | 23 | 23 | 23 |
| Size relationship |  | h1 > h2 | h1 > h2 | h1 > h2 | h1 > h2 |
| h1/h0 |  | 0.36 | 0.36 | 0.36 | 0.36 |

TABLE 3-continued

|  |  |  |  |  |  |
|---|---|---|---|---|---|
| L1/L2 |  | 2.9 | 2.9 | 2.9 | 2.9 |
| Tire mass | Index value | 96 | 96 | 96 | 96 |
| Run-flat durability | Index value | 106 | 105 | 102 | 101 |

|  |  | Example 19 | Example 20 | Example 21 | Example 22 |
|---|---|---|---|---|---|
| Presence/absence of bead filler |  | No | No | No | No |
| Presence/absence of filler layer |  | Yes | Yes | Yes | Yes |
| Bead core structure |  | FIG. 2 | FIG. 2 | FIG. 2 | FIG. 2 |
| W0 | mm | 7.0 | 7.0 | 7.0 | 7.0 |
| W1 | mm | 5.5 | 5.5 | 5.5 | 5.5 |
| W2 | mm | 3.0 | 3.0 | 3.0 | 3.0 |
| Size relationship |  | W1 > W2 | W1 > W2 | W1 > W2 | W1 > W2 |
| W2/W0 |  | 0.43 | 0.43 | 0.43 | 0.43 |
| Rubber occupancy | % | 7 | 7 | 7 | 7 |
| S1 | mm$^2$ | 710 | 720 | 550 | 500 |
| H1 |  | 78 | 78 | 74 | 74 |
| S2 | mm$^2$ | 130 | 120 | 200 | 210 |
| H2 |  | 71 | 71 | 88 | 88 |
| (S2 × H2)/(S1 × H1) |  | 0.17 | 0.15 | 0.43 | 0.5 |
| Position of end of folded back portion |  | Lateral to filler | Lateral to filler | Lateral to filler | Lateral to filler |
| IW/BW |  | 1.00 | 1.00 | 1.00 | 1.00 |
| Internal angle θ | ° | 120 120 | 120 120 | 120 120 | 120 120 |
| T2/T1 |  | 0.7 | 0.75 | 1.1 | 1.2 |
| h0 | mm | 96 | 96 | 96 | 96 |
| h1 | mm | 35 | 35 | 35 | 35 |
| h2 | mm | 23 | 23 | 23 | 23 |
| Size relationship |  | h1 > h2 | h1 > h2 | h1 > h2 | h1 > h2 |
| h1/h0 |  | 0.36 | 0.36 | 0.36 | 0.36 |
| L1/L2 |  | 2.9 | 2.9 | 2.9 | 2.9 |
| Tire mass | Index value | 99 | 99 | 98 | 98 |
| Run-flat durability | Index value | 101 | 102 | 107 | 106 |

TABLE 4

|  |  | Example 23 | Example 24 | Example 25 | Example 26 | Example 27 |
|---|---|---|---|---|---|---|
| Presence/absence of bead filler |  | No | No | No | No | No |
| Presence/absence of filler layer |  | Yes | Yes | Yes | Yes | Yes |
| Bead core structure |  | FIG. 2 | FIG. 2 | FIG. 2 | FIG. 2 | FIG. 2 |
| W0 | mm | 7.0 | 7.0 | 7.0 | 7.0 | 7.0 |
| W1 | mm | 5.5 | 5.5 | 5.5 | 5.5 | 5.5 |
| W2 | mm | 3.0 | 3.0 | 3.0 | 3.0 | 3.0 |
| Size relationship |  | W1 > W2 | W1 > W2 | W1 > W2 | W1 > W2 | W1 > W2 |
| W2/W0 |  | 0.43 | 0.43 | 0.43 | 0.43 | 0.43 |
| Rubber occupancy | % | 7 | 7 | 7 | 7 | 7 |
| S1 | mm$^2$ | 580 | 700 | 500 | 500 | 500 |
| H1 |  | 78 | 78 | 74 | 74 | 74 |
| S2 | mm$^2$ | 138 | 20 | 46 | 210 | 210 |
| H2 |  | 82 | 96 | 98 | 88 | 88 |
| (S2 × H2)/(S1 × H1) |  | 0.25 | 0.04 | 0.12 | 0.5 | 0.5 |
| Position of end of folded back portion |  | Lateral to filler | Lateral to filler | Lateral to filler | Lateral to filler | Lateral to filler |
| IW/BW |  | 1.00 | 1.00 | 1.00 | 1.00 | 1.00 |
| Internal angle θ | ° | 120 120 | 120 120 | 120 120 | 120 120 | 120 120 |
| T2/T1 |  | 0.85 | 0.85 | 0.85 | 0.85 | 0.85 |
| h0 | mm | 96 | 98 | 98 | 96 | 96 |
| h1 | mm | 35 | 13 | 15 | 43 | 48 |
| h2 | mm | 40 | 12 | 14 | 23 | 23 |
| Size relationship |  | h1 < h2 | h1 > h2 | h1 > h2 | h1 > h2 | h1 > h2 |
| h1/h0 |  | 0.36 | 0.13 | 0.15 | 0.45 | 0.5 |
| L1/L2 |  | 1.3 | 4.3 | 4.5 | 2.9 | 2.9 |

TABLE 4-continued

| | | Example 28 | Example 29 | Example 30 | Example 31 |
|---|---|---|---|---|---|
| Tire mass | Index value | 98 | 99 | 97 | 98 |
| Run-flat durability | Index value | 106 | 101 | 102 | 102 |

| | | Example 28 | Example 29 | Example 30 | Example 31 |
|---|---|---|---|---|---|
| Presence/absence of bead filler | | No | No | No | No |
| Presence/absence of filler layer | | Yes | Yes | Yes | Yes |
| Bead core structure | | FIG. 2 | FIG. 2 | FIG. 2 | FIG. 2 |
| W0 | mm | 7.0 | 7.0 | 7.0 | 7.0 |
| W1 | mm | 5.5 | 5.5 | 5.5 | 5.5 |
| W2 | mm | 3.0 | 3.0 | 3.0 | 3.0 |
| Size relationship | | W1 > W2 | W1 > W2 | W1 > W2 | W1 > W2 |
| W2/W0 | | 0.43 | 0.43 | 0.43 | 0.43 |
| Rubber occupancy | % | 7 | 7 | 7 | 8 |
| S1 | mm² | 580 | 580 | 580 | 580 |
| H1 | | 78 | 78 | 78 | 78 |
| S2 | mm² | 138 | 138 | 138 | 138 |
| H2 | | 82 | 82 | 82 | 82 |
| (S2 × H2)/(S1 × H1) | | 0.25 | 0.25 | 0.25 | 0.25 |
| Position of end of folded back portion | | Lateral to filler | Lateral to filler | Lateral to filler | Lateral to filler |
| IW/BW | | 1.00 | 1.00 | 1.00 | 1.00 |
| Internal angle θ | ° | 120 | 120 | 120 | 120 |
| | | 120 | 120 | 120 | 120 |
| T2/T1 | | 0.85 | 0.85 | 0.85 | 0.85 |
| h0 | mm | 96 | 96 | 96 | 96 |
| h1 | mm | 43 | 35 | 35 | 40 |
| h2 | mm | 42 | 30 | 22 | 19 |
| Size relationship | | h1 > h2 | h1 > h2 | h1 > h2 | h1 > h2 |
| h1/h0 | | 0.45 | 0.36 | 0.36 | 0.42 |
| L1/L2 | | 0.5 | 1 | 5 | 6 |
| Tire mass | Index value | 98 | 98 | 98 | 98 |
| Run-flat durability | Index value | 102 | 106 | 105 | 102 |

As can be seen from Table 1, in each of Examples 1 to 31, the tire mass was reduced while the run-flat durability was maintained or improved compared to Conventional Example 1. On the other hand, in Comparative Example 1, the value of (S2×H2)/(S1×H1) was too small, and thus the run-flat durability and the steering stability were deteriorated. In Comparative Example 2, the value of (S2×H2)/(S1×H1) was too large, and thus the run-flat durability and the ride comfort performance were deteriorated. In Comparative Example 3, the width W2 was greater than the width W1, and thus the run-flat durability was deteriorated. In Comparative Example 4, the occupancy ratio of rubber in the closed region was too large, and thus the effect of reducing the tire weight could not be sufficiently obtained.

The invention claimed is:

1. A pneumatic tire, comprising:
a tread portion extending in a tire circumferential direction and having an annular shape;
a pair of sidewall portions disposed on opposite sides of the tread portion;
a pair of bead portions disposed inward of the sidewall portions in a tire radial direction;
a bead core provided in each of the bead portions;
a carcass layer mounted between the pair of bead portions; and
a side reinforcing layer provided inward of the carcass layer in the sidewall portion in a tire lateral direction and having a crescent-shape in cross-section; wherein
the bead core comprises at least one bead wire wound in the tire circumferential direction,
a plurality of circumferential portions of the bead wire form at least one row arranged in the tire lateral direction and a plurality of layers overlapping in the tire radial direction,
a width W0 of one of the plurality of layers which includes a greatest number of rows, a width W1 of another of the plurality of layers which is located on the innermost side in the tire radial direction, and a width W2 of another of the plurality of layers which is located at the outermost side in the tire radial direction, satisfy relationships W1>W2 and W2≤0.5×W0,
the layer of the plurality of layers which includes the greatest number of rows, is located inward in the tire radial direction of the center position of the bead core in the tire radial direction,
the carcass layer includes a body portion extending from the tread portion through each of the sidewall portions to each of the bead portions, and a folded back portion folded at each of the bead portions and curved along a periphery of the bead core, and extending toward each of the sidewall portions while contacting the body portion from an outer end position of the bead core in the tire radial direction,
a ratio of a total area of rubber present in a closed region to an area of the closed region formed by the body portion and the folded back portion of the carcass layer is from 0.1% to 15%,
a filler layer is provided outward of the body portion and the folded back portion of the carcass layer in the tire lateral direction, a cross-sectional area S1 of the side reinforcing layer and a hardness H1 of the side reinforcing layer, and a cross-sectional area S2 of the filler layer and a hardness H2 of the filler layer satisfy a relationship $0.12 \leq (S2 \times H2)/(S1 \times H1) \leq 0.50$, and a height h0 of the side reinforcing layer from a bead toe position, a height h1 from the bead toe position to a position at which thickness of the filler layer is maximum, and a height h2 from the bead toe position to an end of the folded back portion of the carcass layer satisfy relationships $h1 > h2$ and $0.15 \leq h1/h0 \leq 0.45$.

2. The pneumatic tire according to claim 1, wherein an end of the folded back portion of the carcass layer is in contact with the filler layer.

3. The pneumatic tire according to claim 1, wherein when the tire is mounted on a regular rim and inflated to a regular internal pressure, a rim width BW and a tire inner surface maximum width IW satisfy a relationship $0.95 \leq IW/BW \leq 1.20$.

4. The pneumatic tire according to claim 1, wherein at least a portion of the bead wire is layered in a trefoil shape.

5. The pneumatic tire according to claim 1, wherein when a polygon formed by common tangent lines of a plurality of circumferential portions of the bead wire in a meridian cross-section is defined as an outer shape of the bead wire, an internal angle of at least one of corner portions located on opposite ends of one side of the outer shape, which is located inward in the tire radial direction, is equal to or greater than 90°.

6. The pneumatic tire according to claim 1, wherein a total thickness T1 in a tire axial direction of the sidewall portion, which is located at a tire maximum width position, and a minimum value T2 of a total thickness in the tire axial direction of the sidewall portion, which is located in a region where the filler layer is present, satisfy a relationship $0.7 \leq T2/T1 \leq 1.1$.

7. The pneumatic tire according to claim 1, wherein a length L1 along the carcass layer of a region where the side reinforcing layer and the filler layer are overlapped in a state where the carcass layer is interposed between the side reinforcing layer and the filler layer, and a length L2 along the carcass layer of a region where the body portion and the folded back portion of the carcass layer are in contact satisfy a relationship $1 \leq L1/L2 \leq 5$.

8. The pneumatic tire according to claim 2, wherein when the tire is mounted on a regular rim and inflated to a regular internal pressure, a rim width BW and a tire inner surface maximum width IW satisfy a relationship $0.95 \leq IW/BW \leq 1.20$.

9. The pneumatic tire according to claim 8, wherein at least a portion of the bead wire is layered in a trefoil shape.

10. The pneumatic tire according to claim 9, wherein when a polygon formed by common tangent lines of a plurality of circumferential portions of the bead wire in a meridian cross-section is defined as an outer shape of the bead wire, an internal angle of at least one of corner portions located on opposite ends of one side of the outer shape, which is located inward in the tire radial direction, is equal to or greater than 90°.

11. The pneumatic tire according to claim 10, wherein a total thickness T1 in a tire axial direction of the sidewall portion, which is located at a tire maximum width position, and a minimum value T2 of a total thickness in the tire axial direction of the sidewall portion, which is located in a region where the filler layer is present, satisfy a relationship $0.7 \leq T2/T1 \leq 1.1$.

12. The pneumatic tire according to claim 11, wherein a length L1 along the carcass layer of a region where the side reinforcing layer and the filler layer are overlapped in a state where the carcass layer is interposed between the side reinforcing layer and the filler layer, and a length L2 along the carcass layer of a region where the body portion and the folded back portion of the carcass layer are in contact satisfy a relationship $1 \leq L1/L2 \leq 5$.

13. A pneumatic tire, comprising:
- a tread portion extending in a tire circumferential direction and having an annular shape;
- a pair of sidewall portions disposed on opposite sides of the tread portion;
- a pair of bead portions disposed inward of the sidewall portions in a tire radial direction;
- a bead core provided in each of the bead portions;
- a carcass layer mounted between the pair of bead portions; and
- a side reinforcing layer provided inward of the carcass layer in the sidewall portion in a tire lateral direction and having a crescent-shape in cross-section; wherein
- the bead core comprises at least one bead wire wound in the tire circumferential direction,
- a plurality of circumferential portions of the bead wire form at least one row arranged in the tire lateral direction and a plurality of layers overlapping in the tire radial direction,
- a width W0 of one of the plurality of layers which includes a greatest number of rows, a width W1 of another of the plurality of layers which is located on the innermost side in the tire radial direction, and a width W2 of another of the plurality of layers which is located at the outermost side in the tire radial direction, satisfy relationships $W1 > W2$ and $W2 \leq 0.5 \times W0$,
- the layer of the plurality of layers which includes the greatest number of rows, is located inward in the tire radial direction of the center position of the bead core in the tire radial direction,
- a number of rows in the plurality of layers decreases by one, successively, from the layer including the greatest number of rows to the layer located at the outermost side in the tire radial direction,
- at least two adjacent layers of the plurality of layers are offset from one another in the tire lateral direction such that the rows of the at least two adjacent layers are not aligned in the tire radial direction,
- the overall shape of the bead core is designed to be linearly symmetrical with respect to the center of the bead core in the tire lateral direction,
- the carcass layer includes a body portion extending from the tread portion through each of the sidewall portions to each of the bead portions, and a folded back portion folded at each of the bead portions and curved along a periphery of the bead core, and extending toward each of the sidewall portions while contacting the body portion from an outer end position of the bead core in the tire radial direction,
- a ratio of a total area of rubber present in a closed region to an area of the closed region formed by the body portion and the folded back portion of the carcass layer is from 0.1% to 15%,
- a filler layer is provided outward of the body portion and the folded back portion of the carcass layer in the tire lateral direction, and
- a cross-sectional area S1 of the side reinforcing layer and a hardness H1 of the side reinforcing layer, and a cross-sectional area S2 of the filler layer and a hardness H2 of the filler layer satisfy a relationship $0.12 \leq (S2 \times H2)/(S1 \times H1) \leq 0.50$.

\* \* \* \* \*